Figure 1:
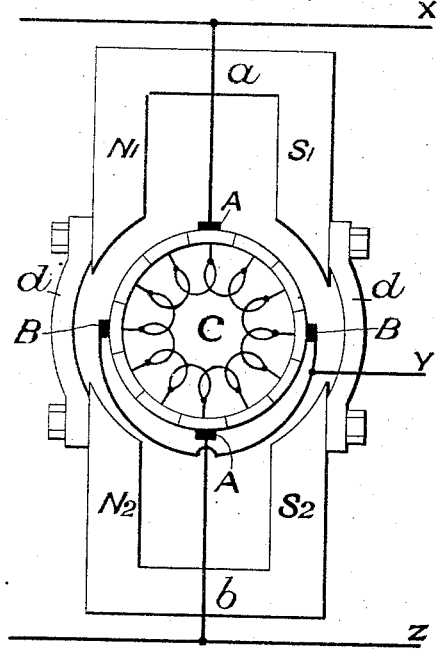

J. C. MACFARLANE & H. BURGE.
DYNAMO ELECTRIC MACHINE.
APPLICATION FILED FEB. 7, 1910.

1,049,114.   Patented Dec. 31, 1912.

UNITED STATES PATENT OFFICE.

JAMES COLQUHOUN MACFARLANE AND HENRY BURGE, OF ARC WORKS, CHELMSFORD, ENGLAND, ASSIGNORS TO THE FIRM OF CROMPTON AND COMPANY LIMITED, OF CHELMSFORD, ENGLAND.

DYNAMO-ELECTRIC MACHINE.

1,049,114. Specification of Letters Patent. Patented Dec. 31, 1912.

Application filed February 7, 1910. Serial No. 542,482.

*To all whom it may concern:*

Be it known that we, JAMES COLQUHOUN MACFARLANE and HENRY BURGE, subjects of the King of Great Britain, residing at Arc Works, Chelmsford, in the county of Essex, England, have invented certain new and useful Improvements in Dynamo-Electric Machines, of which the following is a specification.

This invention relates to a direct current dynamo electric machine for use as a rotary transformer of the kind which has a single ring armature, the said armature being divided into a motor part and a generator part (or multiple thereof) by a pair of auxiliary brushes such as are hereafter referred to, along a plane (or planes) which passes through the said brushes, and a field magnet also divided into a motor part and a generator part, each part being provided with independent windings.

If two brushes, hereinafter called for convenience, the positive and negative main brushes, are placed in the ordinary neutral position, and are supplied with a constant potential difference, and if the field magnets are provided with suitable windings in the ordinary way, the armature will revolve at a definite speed, depending on well known conditions, and there will be a gradual rise of potential all around both sides of the commutator from the negative main brush to the positive main brush. If, now, two further brushes, hereinafter called, for convenience, the auxiliary brushes, are made to bear on opposite sides of the commutator at points approximately equi-distant from one of the main brushes, these two brushes will pick up approximately the same potential. If these brushes are joined together by means of a low resistance conductor, there will be practically no circulating current flowing between the brushes on no load. The potential that the auxiliary brushes will pick up will depend on their distance from the negative main brush, the potential of which, for convenience, is considered zero, so that by placing the auxiliary brushes at any equi-distant points on the commutator from the negative main brush they may be made to pick up any potential from approximately zero to approximately the potential of the positive main brush. Such a machine is provided with three terminals two of which are connected to the main brushes and the third of which is connected to the conductor joining the short-circuited or auxiliary brushes. These three terminals form the connections to the original and transformed circuits, one of them being common to both circuits.

The armature of such a machine may be considered to be divided into two parts along a plane which passes through the auxiliary brushes and is parallel to the axis of the armature shaft. The part between the plane passing through the auxiliary brushes and the positive main brush may be considered the motor part of the armature, and the part between the plane passing through the auxiliary brushes and the negative main brush may be considered the generator part of the armature.

The invention is illustrated diagrammatically in the accompanying drawings.

Figure 2:
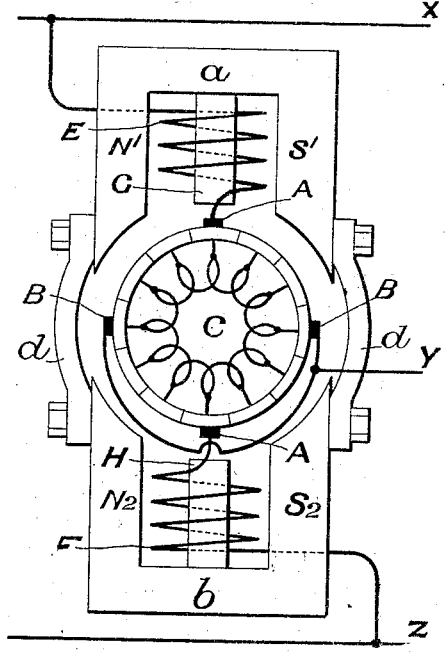
Figure 3:
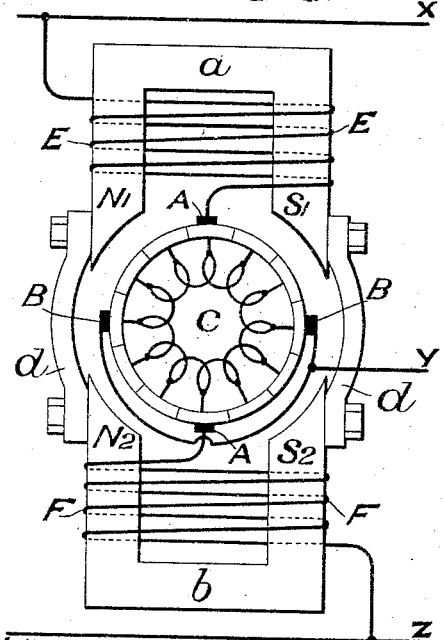
Figure 4:
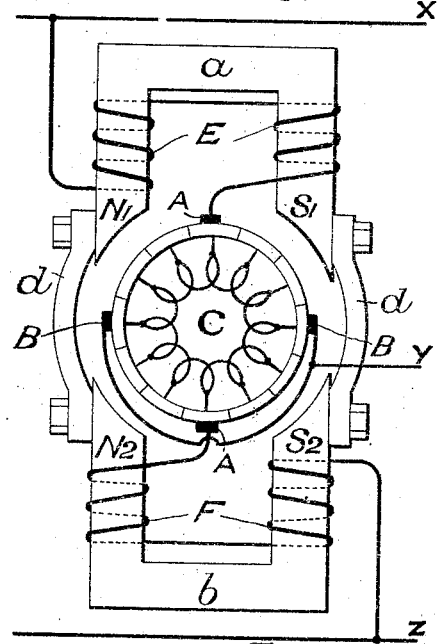

Figure 1 shows a machine with two field systems magnetically isolated in accordance with the invention so as to prevent cross-flux; and Figs. 2, 3 and 4 show different applications of the novel windings also tending to prevent cross-flux.

The ordinary field windings are for the sake of clearance not shown on any of the drawings but in each case the polarity of the various poles of the machines are shown by the letters $N_1 S_1 N_2 S_2$, $N_1 S_1$ referring to the motor field and $N_2 S_2$ to the generator field.

In machines of this type the operation is as follows: The ring armature carries a single winding which is divided into two circuits in parallel to one another by means of the conductor connecting the horizontally-disposed brushes B, B. The magnetic flux traverses the upper half of the armature core in passing from the pole $N_1$ to the pole $S_1$. The motor current entering at the upper brush A and leaving at the brushes B, B, operates to rotate the whole armature under the influence of the field $N_1 S_1$. A current is then generated between the lower brush A and the brushes B, B, under the influence of the field $N_2 S_2$, or such current may be taken out between the lower brush A and the upper brush A under the combined influence of the two fields. By suitably varying the strength of the two fields the machine operates as a rotary converter transforming from any one potential to any other either higher or lower.

It has been found that in machines of the type described unless the two portions of the field, for convenience called the motor and the generator fields, are very completely magnetically isolated from one another the cross flux in the armature, sometimes called the armature reaction, leaks across from the magnetic circuit of one field to that of the other and so back to the armature. Such cross leakage causes an E. M. F. to be generated across the short circuited brushes and causes a heavy useless and wasteful current to circulate in the conductor joining them.

According to the present invention we so arrange the motor field and the generator field that they are completely isolated from each other, and, moreover, we have invented certain novel field windings which perform the same function as the magnetic isolation of the fields, that is to say, they prevent any magnetic lines from circulating from one field to the other. It will, therefore, be apparent that the invention applies to all machines in which there are two independent field systems both operating on the same armature and the purpose of the magnetic isolation of the field systems and of the novel windings is to prevent a cross flux from one such field system to the other.

In all the figures X, Z are the terminals of the primary circuit and Y, Z are the terminals of the secondary circuit; the terminal Z therefore being common to both circuits.

Referring to Fig. 1, A, A, are the main brushes connected to the terminals X, Z, respectively, and B, B, are the auxiliary brushes which are short-circuited or joined by means of a conductor which is connected to the terminal Y, $c$ is the armature adapted to be supported in any suitable or usual manner and to revolve between a motor field and a generator field. $N_1$, $S_1$ are the poles of the motor field and are connected by means of a short thick yoke $a$. $N_2 S_2$ are the poles of the generator field and are connected by means of a short thick yoke $b$.

Both the motor and the generator circuits are designed to be as self-contained as possible and so as to have a minimum of magnetic leakage.

In the drawings the lower of the two field magnets, in this case the generator magnet, forms the base of the machine and the motor magnet is supported thereon as shown by means of two vertical distance pieces $d, d$, bolted or otherwise suitably attached thereto and made of brass or other non-magnetic material, one upon either side of the armature $c$. By means of said non-magnetic distance pieces $d, d$, a very complete isolation of the motor field from the generator field is obtained, and the machine will also have a good weight efficiency.

It will be seen that the operative motor flux in the machine goes up the pole $S_1$ through the short thick yoke $a$, down the pole $N_1$ and back through the upper part of the armature $d$; while the generator flux goes down the pole $S_2$ through the short yoke $b$, up the pole $N_2$ and back through the lower part of the armature $c$. The cross flux, however, which is a vertical flux in the armature $c$ is a flux passing from the generator field as a whole to the motor field as a whole, returning through the air and has therefore to traverse a long air path before it can close on itself, and consequently in the construction described such flux is greatly reduced. The cross flux may also be prevented by means of the novel field windings hereinbefore referred to. The cross flux travels from one field considered as a whole to the other field considered as a whole or back through the air. There are therefore several windings which will tend to prevent its existence. Figs. 2, 3 and 4 indicate different methods of applying said windings.

In Fig. 2 vertical coils E, F, are mounted within the embrace of the motor poles $N_1 S_1$ and the generator poles $N_2 S_2$ respectively; said windings being so wound as to counteract the cross flux as it travels from one magnet to the other. Such an arrangement is very desirable if interpoles such as G, H, be employed, for the coils E, F, can in that case be wound upon said interpoles G, H.

Fig. 3 illustrates an alternative method of applying said coils which are each wound in the same sense around the outside of the poles $N_1 S_1$ and $N_2 S_2$ so as to embrace both the poles. By means of this arrangement the cross flux is prevented from returning through the air outside the iron of the machine.

Again, in Fig. 4 another method of arranging the coils is shown. In this figure the coils E, E, and F, F, are wound upon the poles $N_1 S_1$ and $N_2 S_2$ themselves, and so counteract the cross flux as it passes through said poles; the coils E being wound in the same sense on the poles $N_1 S_1$ and the coils F being wound in the same sense on the poles $N_2 S_2$.

In each arrangement the coils E, F, may be excited by any suitable current such as the current flowing into and out of the main brushes A, A.

It will thus be seen that by means of the construction and of the application of the windings described very complete isolation of the motor field from the generator field is effected and cross leakage of flux is prevented thereby affording greater efficiency and greater economy than heretofore.

What we claim is:—

1. A dynamo electric machine comprising a single ring armature having a commutator, field magnets, each of said field magnets comprising a pair of pole pieces of opposite polarity, distance pieces of non-magnetic material, each connecting a pair of pole pieces of similar polarity isolating magnetically from one another said field magnets and thereby dividing the field into a motor portion and a generator portion, three external terminals, a pair of main brushes resting on said commutator and each connected to one of said terminals, a pair of auxiliary brushes also resting on said commutator, a conductor joining said auxiliary brushes, a connection between the middle point of said conductor and the third terminal of the machine, a series winding influencing the one field magnet to vary the flux equally and in the same sense in each of its pole pieces, and a series winding influencing the other field magnet to vary the flux equally and in the same sense in each of its pole pieces.

2. A dynamo electric machine comprising a single ring armature having a commutator, field magnets, each of said field magnets comprising a pair of pole pieces of opposite polarity, distance pieces of non-magnetic material, each connecting a pair of pole pieces of similar polarity isolating magnetically from one another said field magnets and thereby dividing the field into a motor portion and a generator portion, three external terminals, a pair of main brushes resting on said commutator and each connected to one of said terminals, a pair of auxiliary brushes also resting on said commutator, a conductor joining said auxiliary brushes, a connection between the middle point of said conductor and the third terminal of the machine, a series winding connecting one of said main brushes with its respective terminal and arranged so as to act equally and in the same sense on each pole piece of the field magnet of said motor portion, and a series winding connecting the other of said main brushes with its respective terminal and arranged so as to act equally and in the same sense on each pole piece of the field magnet of said generator portion.

In testimony whereof we have hereunto set our hands in presence of two subscribing witnesses.

JAS. COLQUHOUN MACFARLANE.
HARRY BURGE.

Witnesses:
HARRY J. STOGDEN,
ERNEST JOHN HILL.

---

Copies of this patent may be obtained for five cents each, by addressing the "Commissioner of Patents, Washington, D. C."